(12) United States Patent
Downs

(10) Patent No.: US 8,460,690 B2
(45) Date of Patent: Jun. 11, 2013

(54) PROCESS FOR DETERRING AND TRAINING PETS

(75) Inventor: Jeremiah S. Downs, Orlando, FL (US)

(73) Assignee: PetzOff International, Orlando, FL (US)

(*) Notice: Subject to any disclaimer, the term of this patent is extended or adjusted under 35 U.S.C. 154(b) by 0 days.

(21) Appl. No.: 13/050,300

(22) Filed: Mar. 17, 2011

(65) Prior Publication Data

US 2011/0162588 A1 Jul. 7, 2011

Related U.S. Application Data

(63) Continuation of application No. 12/028,064, filed on Feb. 8, 2008.

(51) Int. Cl.
*A01N 25/34* (2006.01)

(52) U.S. Cl.
USPC ............ 424/411; 119/707; 119/719; 119/721; 119/839; 119/905; 424/402; 424/405; 424/406; 424/407; 424/409; 424/412; 424/413; 424/414; 424/10.31; 424/10.4; 428/57; 428/102; 428/113; 428/221; 428/480; 428/507; 428/907

(58) Field of Classification Search
USPC ....... 119/707, 719, 721, 839, 905; 424/10.31, 424/10.4, 106.1, 402, 403, 404, 405, 407, 424/409, 411, 412, 413, 414; 428/57, 102, 428/113, 221, 480, 507, 907; 514/920
See application file for complete search history.

(56) References Cited

U.S. PATENT DOCUMENTS

| | | | | |
|---|---|---|---|---|
| 5,103,769 | A | * | 4/1992 | Macintosh ................. 119/719 |
| D417,043 | S | * | 11/1999 | Byrne ..................... D30/199 |
| 7,021,244 | B2 | * | 4/2006 | Boyd ...................... 119/721 |
| 2007/0037477 | A1 | * | 2/2007 | Metcalf .................... 446/397 |

* cited by examiner

Primary Examiner — Neil Levy
(74) Attorney, Agent, or Firm — George W. Moxon, II; Brian P. Harrod

(57) ABSTRACT

A process for deterring behavior of pets which includes providing a device comprising a reflective metalized plastic sheet having a thickness of about 0.5 to 10.0 mils, having a reflective and non-reflective side and capable of making a sound when the sheet is flexed by pressure from a pet, a fibrous layer, and a decorative fabric layer, where the layers are joined together to form the device, and the reflective side of said reflective plastic layer is oriented outward, where the device is capable of being folded or rolled-up, and when placed on an object, the device deters pets from getting on said object.

9 Claims, 1 Drawing Sheet

ND TRAINING
PROCESS FOR DETERRING AND TRAINING PETS

The present application is a continuation of patent application Ser. No. filed on Feb. 8, 2008, the disclosure of which is incorporated herein by reference.

BACKGROUND OF THE INVENTION

The present invention is related to devices for deterring pets from getting on furniture and thus correcting undesired behaviors of pets.

Many domestic pets present undesirable behaviors that are related to and dependent on a particular isolated location. Some examples of this type of behavior include a dog eating the food of a cat or a pet toppling a trashcan. It is understood that restraining the pet from approaching the particular isolated location relating to the undesired behavior would eliminate the behavior. It is also understood that pets without behavior problems need not and, in some situations, cannot be restricted from the particular location of interest. One traditional solution to this issue is to restrain the pet with the undesired behavior from the particular location by positioning a fence, gate, or other physical-type boundary around the particular location. This solution is limited in that it is space consuming, decoratively unappealing, and potentially destroyable or surmountable by the pet under consideration. Additionally, this approach restricts all pets, not just the pet with an undesirable behavior, from accessing the particular location.

Another conventional solution to the issue of correcting the undesired behaviors of a pet that are relative to a specific isolated location is the implementation of an invisible restraint, which is typically referred to as an invisible fence. An example is U.S. Pat. No. 7,021,244 to Boyd. Conventional invisible restraints include an insulated conductive wire, a transmitter, and a receiver. The wire is disposed such that it defines the perimeter of the desired area of restriction and serves as an antenna for the transmitter, which emits a radio signal that produces and electromagnetic field that radiates from the wire. The receiver is worn by a pet and is responsive to the electromagnetic field such that as the equipped pet approaches the wire, the receiver detects the field and administers a deterrent to the pet, thus restraining the pet from continuing toward the restricted area.

Conventional pet correction mats also propose a solution to the issue of correcting the undesired behaviors of a pet that are relative to a specific isolated location. A pet correction mat discourages a pet from touching the mat by providing a series of sharp spikes, such as U.S. Des. 417,043 to Byrne or by administering a static stimulation to the pet when the pet contacts the mat, such as U.S. Pat. No. 4,969,418 to Jones. Therefore, when a pet correction mat is positioned at the desired area of restriction, a pet cannot access the restricted area without receiving a stimulus, such as a static spark or encountering the sharp surface, thus restraining the pet. Because a pet correction mat administers a static stimulus to anything that contacts the mat, a pet correction mat cannot distinguish between the pet with an undesired behavior and a pet that needs no discipline. Therefore, a conventional pet correction mat prevents pets without behavior problems and even humans from accessing the desired area of restriction. This condition limits the pet correction mat from being of value for situations such as the previously discussed examples of a dog eating a cat's food or a dog toppling a trashcan.

SUMMARY OF THE INVENTION

The present invention is directed to a device for deterring behavior of pets which is a laminate of a reflective plastic layer having a thickness of about 0.5 to 10.0 mils and capable of making a sound when the sheet is flexed, a fibrous layer, and a decorative fabric layer, where layers are joined together to form the device.

BRIEF DESCRIPTION OF THE DRAWINGS

The foregoing, and additional objects, features and advantages of the present invention will be understood from the following detailed description of preferred embodiment thereof, taken with the accompanying drawings, in which.

DETAILED DESCRIPTION OF THE INVENTION

Figure 1:
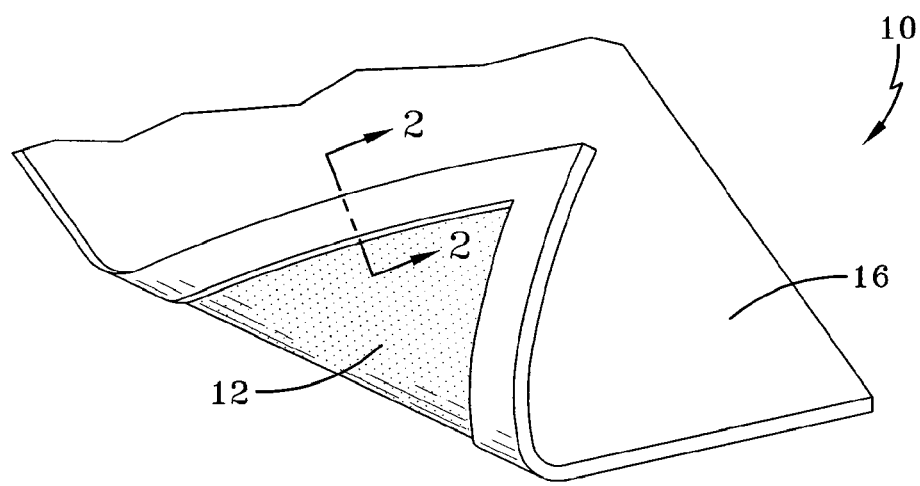
FIG. 1 is a perspective view of the present invention.

The present invention is directed to a location specific training device inventors that deters undesirable behavior while protecting surfaces. It will condition dogs, cats, and other small animals to avoid areas where the device is employed. It will not cause pain to the animal or reduce the visual appeal of the area. This allows the user to condition short term and long term behavior, resulting in protection of furniture and/or specific locations with a home or vehicle.

The present invention is the result of selecting a combination of materials and structuring them to produce the desired effect while balancing the functionality and esthetics of the product. The device is a laminate of a layer of reflective plastic film, a fabric or batting layer which may or may not have an embedded non-toxic pet repellant or other scent materials, and a finished fabric layer that will provide the desirable esthetics. The reflective side of the plastic layer is oriented outward. The shape of the device is not critical, and while rectangular and oval shapes are preferred, it will be appreciated that is could be an variety of geometric shapes.

In use, the device is placed on an object, such as a chair or sofa with the reflective side up so that the reflection will startle or defer an animal, such as a pet, from getting on it. Further, the reflective layer, as part of the plastic layer will make a noise when the reflective plastic is flexed from pressure from, e.g., a paw, and the noise will startle and deter the pet from going onto the covered furniture piece. An option is to embed or coat the fabric or batting layer with a repellant which will repel the animal as well. Finally, the device has a decorative fabric layer which will make the device more attractive when that surface is exposed. The device will not have the reflective surface exposed, but the pressure of a paw or the like on the fabric will cause the plastic layer to flex and make a noise, and thus deter the pet. By placing the device on appropriate furniture, a pet can be influenced and trained to avoid those objects.

The plastic film will be a layer of polymer film having the strength to resist penetration of pet claws and tearing and thick enough to generate a noise when flexed. While the thickness is not critical, it will be in the range of 0.5 to 10 mils thick, with 1 to 6 mils being preferred. The plastic film can have a reflective surface or have metallic layer adhered to the surface to provide the reflectivity. The plastic film preferably will be flexible enough to allow the device to be folded or rolled. The plastic film can be one layer or could be composed of several layers which together provide the appropriate strength and penetration resistance. A variety of plastic films can be employed, but polyester films are preferred. For example, Mylar® film is a biaxially oriented polyester film and its performance be improved by cross laminating films. Also, there is not a minimum number of layers that can be laminated. It will be appreciated that it is the functionality that is critical for the plastic film. Mylar® film is a commercially available (from DuPont Teijin Films) polyester, specifically polyethylene terephthalate (PET), film and can have a metalized, preferably aluminized, surface. Thus, the plastic film would have the necessary penetration and tear resistance and have a reflective surface. Alternatively, a reflective metal layer can be laminated to the plastic surface to provide the reflectivity.

The surface is exposed in the device and will function to repel the animals due to its reflectivity and due to the fact that it will make a distinctive noise such that the animal is frightened off the surface. The levels of reflectivity and the noise levels of a 1 to 6 mils, preferably about 1 mil, Mylar® film having an aluminized surface are sufficient to produce reflectivity and noise that will repel most animals. The animals are startled by the reflected light and when they apply pressure to the film it make a noise that startles and repels the animal.

The plastic film can be constructed of polyethylene, ionomer, acetate, acrylate, like methyl methacrylate or acrylic acid, polyethylene copolymer, such as EVA, EAA, EMMA, EMM), polyetheretherketone, polycarbonate, such as Makrolon® from Bayer AG, acrylonitrile, nylon, polybutylene, polyester (e.g., PET), polybutylene terephthalate (PBT), polyetherimide, ionomer, polyimide, polypropylene, styrenebutadiene copolymer, polyvinyl chloride (PVC), polyvinylidene chloride (PVdC), or combinations of plastic layers such as PVdC coated polyester, PVdC coated polypropylene, acrylic coated polypropylene, and the like.

The batting layer will be a non-woven layer of fibers, such as cotton, wool, polymer fibers, such as polyester fibers, or combinations of fibers such as, for example, a combination of cotton and polyester fibers. The fiber size is not critical and the batting could include microfibers and/or nanofibers. The thickness of the batting layer is not critical. It is preferred to be about 1 to 20 centimeters thick. It should be thick enough to give the laminate some substance and stiffness, but not so stiff as to prevent the device from being folded or rolled-up. The synthetic fabric can be a polyethylene, a polyester, a polypropylene, a rayon, a nylon, or mixtures thereof. Examples of synthetic fabrics or papers that can be used include, but are not limited to, TYVEK® nonwoven polyethylene fabrics, SONTARA® polyester blend fabrics, and spunbond nonwoven polypropylene fabrics. It would be an option to have the fabric batting meet the requirements for fire resistant fabrics or flame retardant fabrics by using fibers that are themselves flame retardant or by applying a finish to the fibers or the fabric. These characteristics are guided by the ASTM (American Society for Testing and Materials) standards and the NFPA (National Fire Prevention Association) standards. Such materials are well known.

The finishing fabric or decorative layer can be any sort of decorative fabric such as a cotton, wool, or polyester fabric. The use of a decorative layer allows the device to be used with furniture and in areas where there are aesthetic considerations. The thickness of the fabric is not critical and will be in the range of about 0.5 to 5 centimeters thick.

Figure 2:
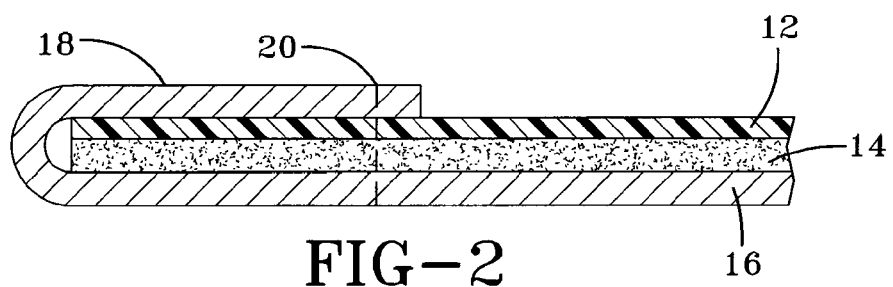
FIG. 2 is a cross-sectional view of the present invention taken along line 2-2 in FIG. 1.
Figure 3:
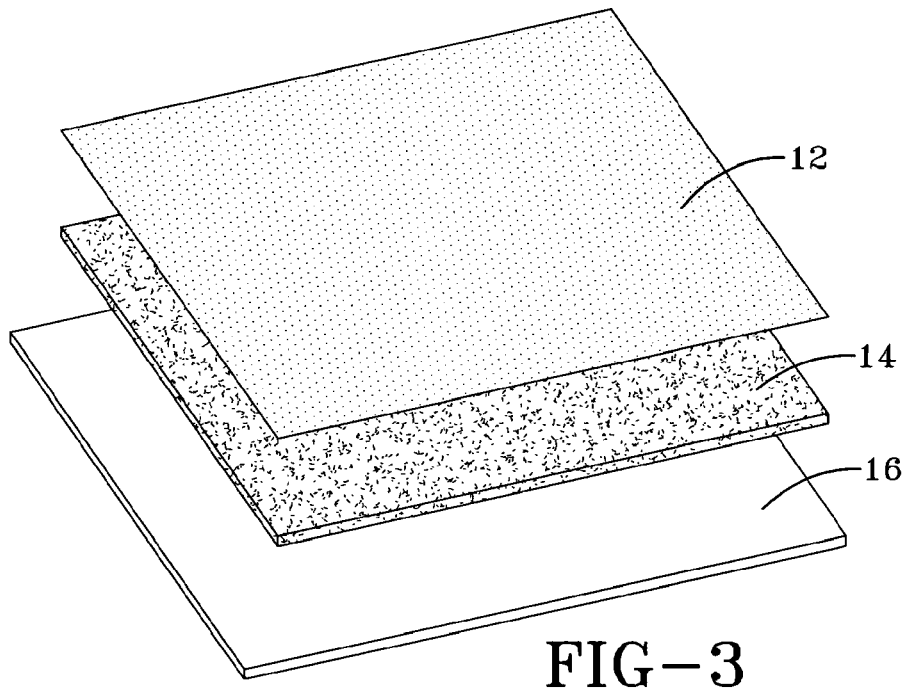
FIG. 3 is an exploded view of the present invention.

As can be seen in FIGS. 1-3 the device 10 is made up of three basic layers, a plastic layer 12, a batting layer 14 and a decorative fabric layer 16. As seen in FIGS. 1 and 2, the decorative fabric layer 16 can be turned around the laminate by having the fabric 16 be larger than the plastic and batting layers and folding the excess 18 onto the plastic layer. The layers can then be joined together by sewing the layers together using stitching 20 around the periphery of the laminate. Alternatively, the layers could be adhesively bonded together, stapled together, or otherwise mechanically bonded together.

The repelling composition for animals can be added to the batting, if employed, could include a composition achieved by adsorbing at least one substance of phthalic acid esters, citric acid esters and glycols and an repellent on active carbon fiber. Other repellents for dogs and cats that could be used include cinnamic aldehyde, y-nonylolactone, lemon oil, paracresol acetate and the like. The amount of a repellent is not critical. The repellant can be one that gradually releases the repellent. In addition to repellants, deodorant or antimicrobials could be employed. The pet repellant of could contain a bittering agent in a range of from about 0.005% by weight to about 0.06% by weight of the pet repellant. The agent could be Denatonium Benzoate NF-Anhydrous. Bitrex®, manufactured by Henley Chemicals, Inc., is one form of Denatonium Benzoate NF-Anhydrous. The amount of bittering agent can be about 0.03% by weight of the pet repellant.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for deterring behavior of pets comprising:
   providing a device comprising:
   a reflective metalized plastic sheet having a thickness of about 0.5 to 10.0 mils, having a reflective side and a non-reflective side, and capable of making a sound when said sheet is flexed by pressure from a pet,
   a fibrous batting layer, and
   a decorative fabric layer, wherein the decorative fabric layer is selected from the group consisting of cotton, wool, and polyester fabric and is 0.5 to 5 centimeters thick,
   said layers being joined together to form said device, wherein said fibrous batting layer is between the plastic sheet and the decorative fabric layer, the reflective side of said reflective plastic sheet is oriented outward, and the device is capable of being folded or rolled-up, and placing said device on an object to deter pets from getting on said object, without causing pain or risking harm to said pets.

2. The process of claim 1 wherein the plastic sheet is a polyester sheet.

3. The process of claim 1 wherein the plastic sheet is 0.5 to 6 mils thick.

4. The process of claim 1 wherein the reflective plastic sheet is an aluminized polyester sheet.

5. The process of claim 1 wherein the fibrous layer is non-woven cotton batting.

6. The process of claim 1 wherein the fibrous layer is 1 to 20 centimeters thick.

7. The process of claim 1 wherein fibrous layer is impregnated with a non-toxic pet repellant.

8. The process of claim 1 wherein the layers are stitched together around their periphery.

9. The process of claim 1 wherein fibrous layer is impregnated with a fire-retardant.

* * * * *